United States Patent [19]

Swain

[11] 3,768,011

[45] Oct. 23, 1973

[54] MEANS FOR MEASURING MAGNITUDE AND DIRECTION OF A DIRECT CURRENT OR PERMANENT MAGNET, INCLUDING CLIP-ON DIRECT CURRENT SENSING INDUCTOR

[76] Inventor: William H. Swain, 4662 Gleason Ave., Sarasota County, Fla. 33581

[22] Filed: June 9, 1970

[21] Appl. No.: 44,761

[52] U.S. Cl. .......................... 324/117 R, 324/43 R

[51] Int. Cl. ........................ G01r 33/00, G01r 33/02

[58] Field of Search ............. 324/117 R, 127, 43 R, 324/43 G; 323/48; 328/13, 150

[56] References Cited

UNITED STATES PATENTS

| | | | |
|---|---|---|---|
| 3,422,352 | 1/1969 | Paulkovich | 324/117 X |
| 3,454,879 | 7/1969 | Smitka | 324/117 |
| 3,539,908 | 11/1970 | Zelina | 323/48 |
| 2,836,791 | 5/1958 | Kaplan | 324/117 X |
| 2,991,414 | 7/1961 | Tillman | 324/43 |
| 3,197,702 | 7/1965 | Schweitzer, Jr. | 324/127 |
| 3,396,338 | 8/1968 | Buchanan et al. | 324/117 |
| 3,434,052 | 3/1969 | Fechant | 324/127 |
| 3,487,299 | 12/1969 | Hart et al. | 324/43 |

*Primary Examiner*—Rudolph V. Rolinec
*Assistant Examiner*—Ernest F. Karlsen

[57] ABSTRACT

A direct current or magnetic intensity input produces an offset in the average magnetic intensity applied to a sense inductor core of non-linear magnetic material. No electrical connection is required, and the measured current need not be interrupted. The core is coupled to an oscillator constructed so that the duty factor modulation and direct current output are linear functions of the input and restore the average magnetic intensity.

Clip-on DC milliameter sense inductors which largely cancel magnetic noise are included with the description of embodiments of this invention. They are sensitive, small in size, inexpensive, and will outperform larger and more costly devices. Power consumption is greatly reduced because fewer components are used more effectively.

16 Claims, 9 Drawing Figures

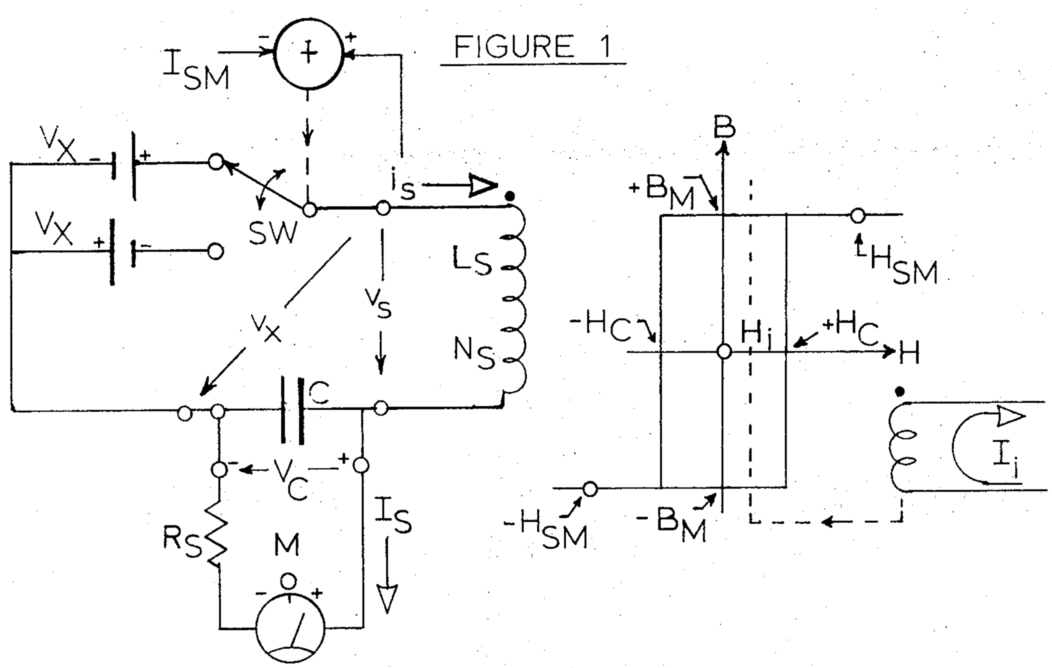
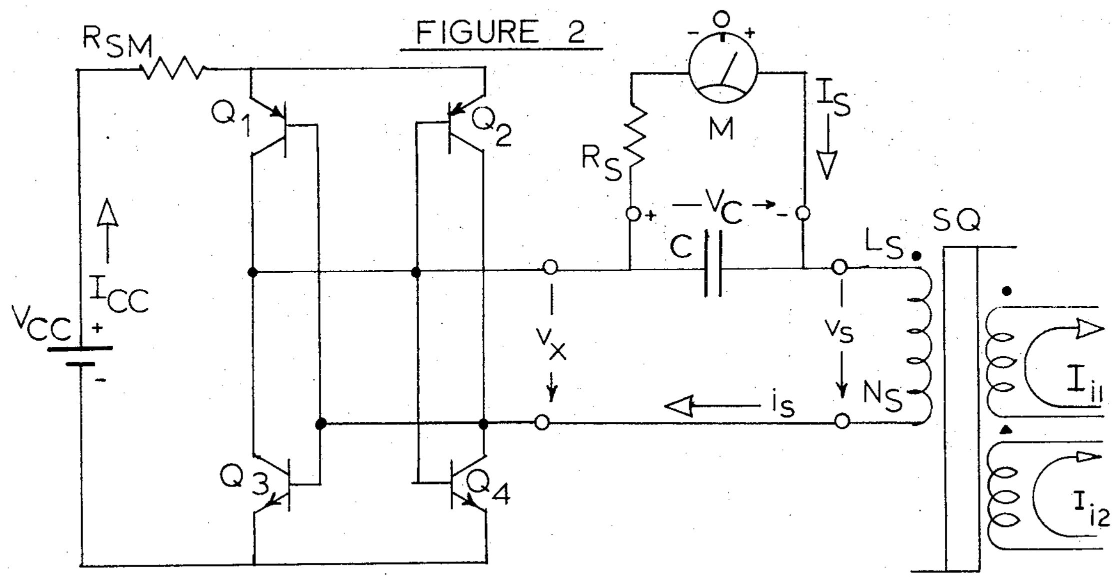
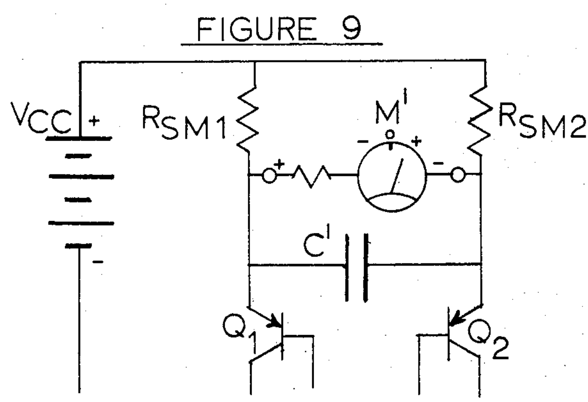
INVENTOR.
WILLIAM H. SWAIN
BY William H. Swain

INVENTOR
WILLIAM H. SWAIN
William H. Swain

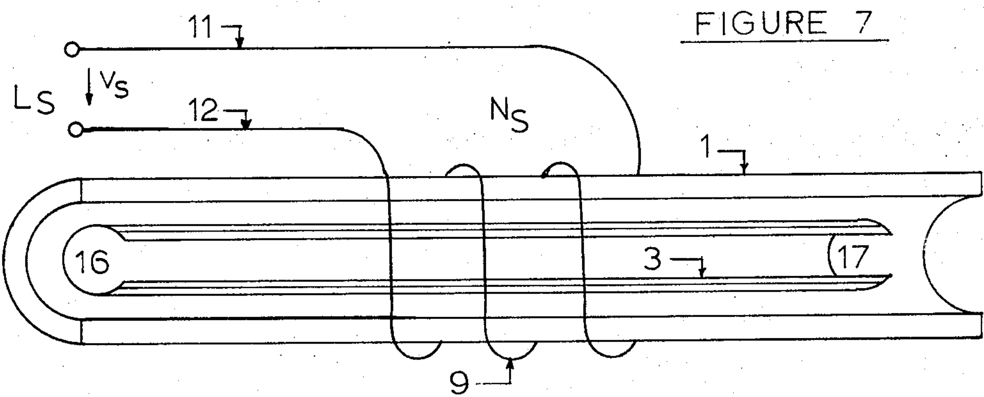
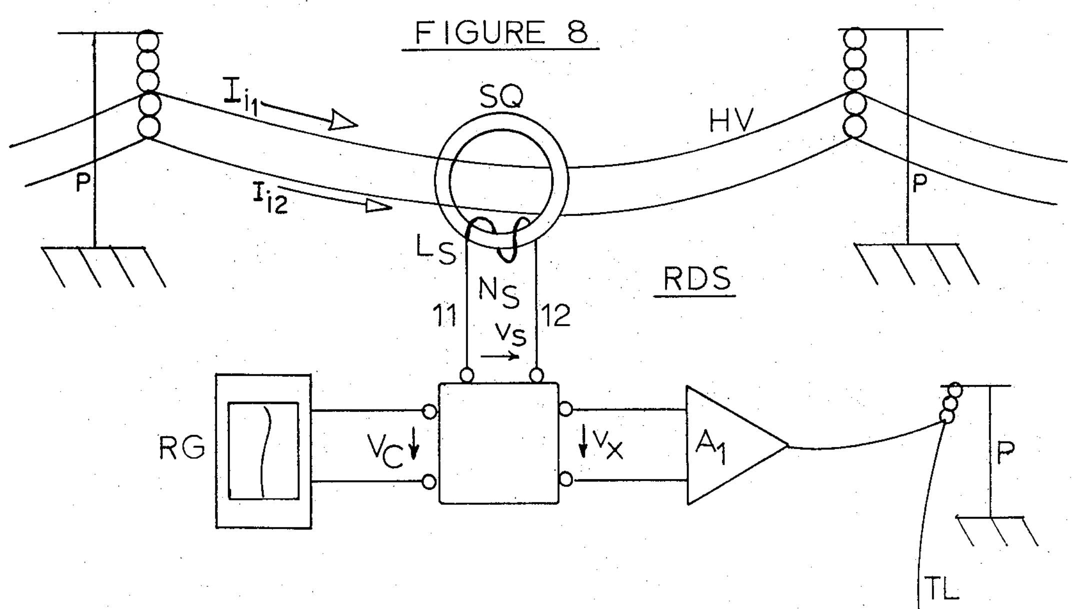
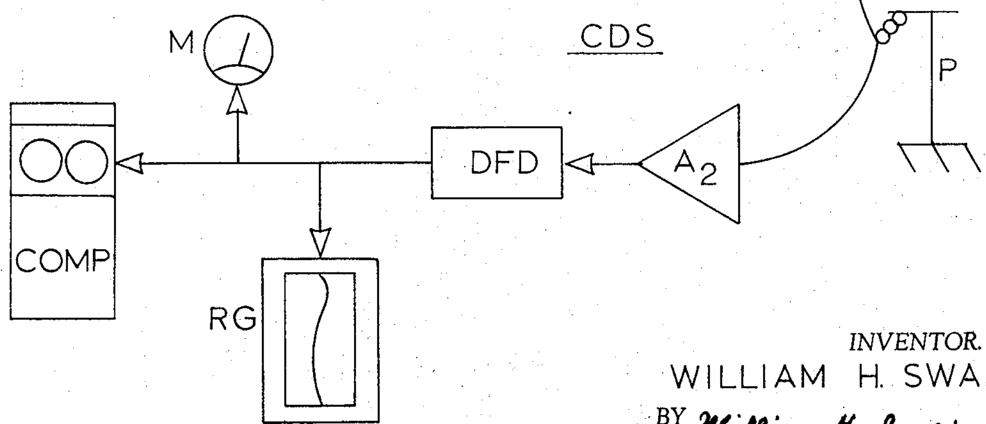
INVENTOR.
WILLIAM H. SWAIN
BY William H. Swain

MEANS FOR MEASURING MAGNITUDE AND DIRECTION OF A DIRECT CURRENT OR PERMANENT MAGNET, INCLUDING CLIP-ON DIRECT CURRENT SENSING INDUCTOR

This invention relates to the measurement of the magnitude and direction of direct current flowing in a conductor without the need to make electrical contact or interrupt the current to be measured. It also relates to measurement of the intensity and direction of a magnetic field which may arise from a permanent magnet or the earth's field. The outputs of these direct current and magnetic field measuring instruments are linearly proportional to the magnetic field intensity present in the vicinity of the sensing inductor; not the flux flowing in the core of the sensing inductor. This, together with the simpler, more accurate, and less costly method and means, distinguish this invention from previously known magnetic amplifier and flux gate techniques.

In the past, clip-on DC ammeters and magnetic measuring instruments have been made bulky and expensive because a gated flux had to be established and measured, or two distinct magnetic amplifier cores had to be coupled to a circuit and the field to be measured. The possibility of errors due to uncertain or unbalanced magnetic path reluctance increased cost and complexity in previously known instruments.

Each instrument embodying the principles of the present invention ordinarily includes a rectangular wave oscillator coupled to a sensing and measuring inductor having a non-linear core. The direct current from the oscillator which is made to flow in the inductor is a measure of the input current or magnetic field. The oscillator also produces a duty factor modulated output signal which is suited for telemetry.

An object of the present invention is to provide method and means to improve sensitivity, accuracy, and convenience and reduce the size and cost of local or remote direct current or magnetic field direction and intensity measurement.

A further object of this invention is to provide a direct current sensing element which is accurate and sensitive and yet unresponsive to nearby magnetic noise fields which would otherwise cause an error in the measurement to be made.

Still another object of this invention is to provide a remote direct current sensing element which is accurate and sensitive and yet unresponsive to nearby magnetic fields which would otherwise cause an error in the measurement to be made, and can easily be clipped around a current-carrying conductor in order to greatly simplify the measurement of direct current by making it unnecessary to interrupt the current to be measured.

Another object of this invention is to provide a simple and accurate direct current thensformer.

Yet another object of this invention is to produce a signal suited for transmitting the current or magnetic field measurement to a remote point over an accurate yet simple and low cost telemetry link.

It is another object of this invention to provide a sensing element suited for measurement of the direction and magnitude of a magnetic field such as that of the earth or a permanent magnet.

Still a further object of this invention is to provide a simple and low cost electrical oscillator which is readily controlled by an inductor and operable from a single small Voltaic cell power source.

Another object of this invention is to provide an accurate yet simple and low cost duty factor modulated signal generator.

The method and means of the present invention are general and may be applied to the detection and measurement of a variety of direct and time variable currents and magnetic fields. Other objects and advantages of this invention will be apparent from the following description taken in conjunction with the accompanying drawings.

On the drawings:

FIG. 1 is a Functional Diagram and magnetic induction versus intensity graph of a non-linear core, together with functional and physical components used in applying the principles of the present invention. These are used in describing and analyzing the general and specific behavior of embodiments of this invention.

FIG. 2 is the schematic diagram of an embodiment of the present invention showing a practical battery-powered rectangular wave oscillator coupled to a toroidal direct current sensing and measuring inductor so that one or more input currents produce a linearly proportional output current in the meter circuit and a corresponding modulation of the oscillator's duty factor. A simple means for modifying FIG. 2 to add power gain is shown in FIG. 9.

FIG. 3 is the schematic diagram of another but not preferred embodiment of the present invention used to further describe the general method and means of the present invention.

FIG. 4 is a side view of a preferred embodiment of the present invention showing a clip-on sense and measuring inductor with provision for cancelling out the effect of magnetic noise. It is preferred for measuring direct current direction and magnitude where space permits, magnetic interference may be a problem, and currents of 1 milliampere to 5 amperes are to be measured in conjunction with the oscillator shown in FIG. 2.

FIG. 5 is a side view of the thinner of two embodiments of the present invention preferred when small size is required. It shows a small-sized clip-on sense inductor for use with the oscillator shown in FIG. 2 to measure the direction and magnitude of direct currents as small as 1 milliampere or as large as 1 ampere in a restricted space where magnetic noise interference is not present, or where a magnetic shield cylinder can be slid over the clip during measurement.

FIG. 7 is a side view of a preferred embodiment of the present invention showing a magnetic intensity sensing and measuring inductor for use with the oscillator shown in FIG. 2 to measure magnetic intensity and direction in a space where the field is relatively uniform over a 5-inch length. This embodiment is preferred for measuring earth's magnetic field.

FIG. 8 is a functional diagram of a system provided in accordance with the principles of the present invention for measuring one or more direct currents in a high-voltage transmission line and conveying this measurement to a remotely located central data station over a telemetry link.

FIG. 9 shows a simple means for modifying the schematic diagram in FIG. 2 to obtain power gain and thus increased sensitivity in accordance with the principles of the present invention.

Figures 3, 4, 5, 6:
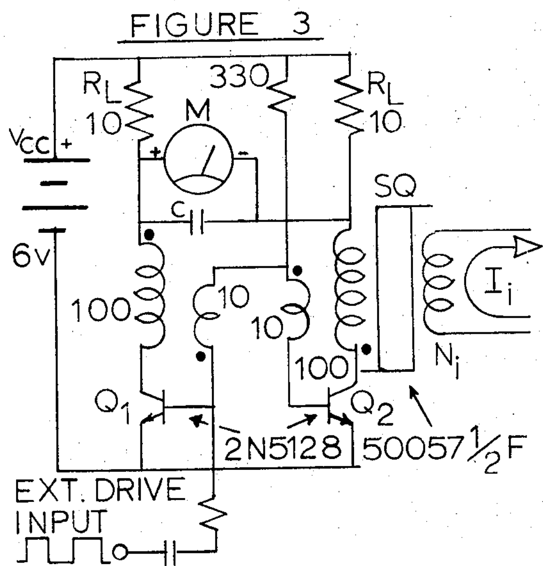
FIG. 6 is a side view of the shorter of two small and preferred embodiments of the present invention showing a small-sized clip-on sense inductor which may be used instead of the embodiment in FIG. 5.

The Functional Diagram and Hysteresis Loop shown in FIG. 1 include components and concepts used in describing the basic method and means for construction and operation of direct current measuing instruments. A complete practical instrument is described in sections which follow this basis description of the present invention.

The magnetic intensity $H_i$ to be measured is produced by steady or slowly changing input direct current $I_i$ flowing in one or more turns of an electrical conductor or wire $N_i$ wound around the square loop sensing and measuring core SQ which is also the core of sensing and measuring inductor $L_S$ having a multiplicity of turns $N_S$ of wire linking the same core. In practice, this core SQ will ordinarily not have the ideally non-linear form shown in the B-H curve of FiG. 1, but its magnetic material will exhibit a relatively high permeability $U=dB/dH$ at some low magnetic induction B, and substantially less permeability at some greater magnetic indiction such as $B_M$ in FIG. 1.

The operation of a rectangular wave electrical oscillator to be described later is represented by switch SW which connects the dotted end of coil $N_S$ to the positive voltage supply $+V_x$ during the first part of the oscillator's operating period $T_1$, holds this connection closed during all of $T_1$, and when the magnitude of current $i_S$ in inductor $L_S$ exceeds threshold level $I_{SM}$ this switch transfers the dot end of $L_S$ to negative voltage supply $-V_X$; holds this connection all during second oscillator period $T_2$ during which the magnitude of $i_S$ is less than $I_{SM}$, and transfers back to $+V_X$ at the end of time interval $T_2$ when the magnitude of $i_S$ exceeds $I_{SM}$. Inductor $L_S$ is returned to the battery common point through output circuit meter M which has resistance $R_S$ and is shunted by large capacitor C having terminal voltage $V_C$ which is essentially constant over the full period T of the oscillator because the reactance of C is much less than the resistance $R_S$ and inductive reactance and inertial generator effects of meter M.

The principles and methods of the present invention are taught in the analysis and description which follow. The simplifications and idealizations inherent in FIG. 1 and this description of its operation serve to clarify the fundamental concepts in the theory of operation. Practical clip-on DC ammeters and magnetometers have been constructed to verify this theory. While second and third order errors resulting from the use of non-ideal components must be considered in constructing a precision instrument, this theory has been found sufficient for design calculations. This theory also shows that an embodiment closely approximating the idealizations will provide:

1. An ideally linear direct current thansformer.
2. Duty factor modulation of the rectangular wave oscillator which, when demodulated in an ideal duty factor demodulator, will produce an output current which is an ideally linear function of the input current or magnetic intensity.
3. Increasing output circuit or meter resistance increases the magnitude of the duty factor modulation signal but does not affect its linearity.
4. Changes in operating voltage, coercive force, saturation flux density, and switching threshold current produce no zero shift and will produce no significant change in direct current transformation ratio so long as the synthetic magnemotive force term $H_X$ greatly exceeds the coercive force of the core $H_C$. In other words, there appears to be a large negative feedback factor which stabilizes the action of the whole circuit.

The following discussions of the operating theory will convey the method and describe means for constructing instruments which operate as stated above. General design equations are derived and applied to the analysis of a practical DC ammeter. This is followed by a qualitative discussion of the principles of operation. The description of still another embodiment is followed by descriptions of several sensing inductors. I conclude with a description of means for increasing sensitivity and telemetering remote measurements to a central station.

The functional diagram shown in FIG. 1 is arranged so that during the first time interval $T_1$ of the rectangular wave oscillator the total magnomotive force $H_1$ applied to the ideally non-linear sense core SQ must exactly equal its coercive force $+H_C$, and its magnetic flux density B must shift from the negative saturation level $-B_M$ to the positive saturation level $+B_M$. The total sense core magnemotive force $H_1$ is the sum of the input magnemotive force $H_i$ and the magnemotive force $H_{S1}$ produced by current $i_{S1}$ flowing in winding $N_S$ of inductor $L_S$ having core SQ. Input $H_i$ may be produced by an applied magnetic field to be measured or by a magnemotive force $H_i$ resulting from an input current $I_i$ to be measured which flows in a conductor circuit having $N_i$ turns linking the core SQ.

The time $T_1$ required to switch the flux density B from $-B_M$ to $+B_M$ as shown in the hysteresis loop representation of FIG. 1 is determined by the net voltage $V_{S1}$ applied to inductor $L_S$ during $T_1$. $V_{S1}$ is the difference between positive supply voltage $+V_X$ and the voltage $V_C$ across charge integrating capacitor C. When B exceeds $+B_M$ the current $i_S$ will suddenly increase to a madnitude exceeding threshold current $I_{SM}$. Then the action of the oscillator circuit to be described later causes switch SW to transfer the dot end of $L_S$ to equal magnitude negative supply voltage $-V_X$ and thus initiate second time interval $T_2$.

Current threshold $I_{SM}$ must be great enough so that the field $H_{SM}$ produced by $I_{SM}$ flowing in winding $N_S$ exceeds the greatest input field $H_i$ which is to be measured.

During $T_2$ the total field $H_2$ applied to core SQ must equal $-H_C$, and is again the sum of input field $H_i$ and the field $H_{S2}$ produced by current $i_{S2}$ flowing winding $N_S$ of inductor $L_S$. The flux density $B$ shifts from $+B_M$ to $-B_M$ during $T_2$, which has a duration determined by the voltage $V_{S2}$ applied to inductor $L_S$; $V_{S2}$ having a magnitude equal to the sum of negative supply voltage $-V_X$ and capacitor voltage $V_C$.

The charge integrating capacitor has enough capacitance to keep its voltage $V_C$ essentially constant over a full operating period $T$ of the rectangular wave oscillator. The voltage $V_C$ is the integrated result of current $i_{S1}$ applied for time $T_1$, algebraically added to $i_{S2}$ applied for time $T_2$, less the current drawn off to meter M through resistance $R_S$ which flows over the full period $T$. The meter may be replaced by a computer or other indicating device, or may be the input terminals of a telemetry system.

The explanation given above is more exactly stated in the following summary of useful relationships. The mean flux path length of core SQ is designated by the symbol 1, and the corss-sectional area of the core material is $A$.

$$H_1 = H_c = H_i + H_{s1} = \frac{N_i I_i}{l} + \frac{N_s i_{s1}}{l}. \qquad H_2 = -H_c = H_i + H_{s2} = \frac{N_i I_i}{l} + \frac{N_s i_{s2}}{l}. \quad (1)$$

$$T_1 = \frac{2N_s A B_m}{V_x - V_c}. \qquad T_2 = \frac{2N_s A B_m}{V_x + V_c}. \quad (2)$$

$$T \equiv T_1 + T_2, \qquad \frac{T_1}{T_2} = \frac{V_x + V_c}{V_x - V_c}. \quad (3)$$

$$= \frac{4N_s A B_m}{V_x}\left\{\frac{1}{1-\left(\frac{V_c}{V_x}\right)^2}\right\}. \quad (4)$$

$$H_{i_{max}} \lessapprox H_{sm} \lessapprox \frac{N_s I_{sm}}{l}. \quad (5)$$

$$I_s = \frac{l}{N_s}\left\{\frac{T_1}{T}(H_c - H_i) + \frac{T_2}{T}(-H_c - H_i)\right\} = \frac{l}{N_s}\left\{H_c\left(\frac{2T_1}{T} - 1\right) - H_i\right\}. \quad (6)$$

$$I_s = V_c / R_s. \quad (7)$$

The result of inserting eq. 6 and 7 in eq. 3 and solving for the ideal duty factor modulation term $[(2T_1/T) - 1)]$is $$(2T_1/T) - 1 = - Hi/Hx - Hci, \quad (8)$$

where the synthetic circuit magnetic intensity $H_X$ is introduced for convenience and defined as $$H_X \equiv N_s V_x / l R_s. \quad (9)$$

Inserting the duty factor term of eq. 8 in eq. 6 gives the current transformer relation $$I_s = -\left(\frac{N_i}{N_s}\right)\left\{\frac{1}{1-\frac{H_c}{H_x}}\right\} I_i. \quad (10)$$

If the material of core SQ has very low hysteresis $H_C$ and/or the supply voltage $V_X$ and winding $N_S$ are large together with short magnetic path length 1 and low output circuit resistance $R_S$, then $$H_c / H_x << 1,$$

and the current transformation ratio approaches $$I_s \doteq - N_i / N_s I_i. \quad (11)$$

This is the ideal desired for direct current instruments. Note that reducing the term $H_C/H_X$ in eq. 10 is similar in effect to using a lot of negative feedback to stabilize the gain of an amplifier. Thus the current transfer ratio and zero error can be made very nearly independent of circuit parameter variations, except $N_i/N_S$ which is an inherently stable physical turns ratio.

Moreover, the effect of a large meter or output circuit resistance $R_S$ or low circuit voltage $V_X$ is to increase the effective current transformation ratio given in eq. 10. In practice, this "positive feedback" effect is relatively stable up to a multiplication factor of roughly 5, and of itself induces no zero error. This effect is useful in increasing sensitivity.

A primary advantage of this approach is the inherent balance which tends to keep zero errors well within tolerable limits.

It can be shown that an ideal demodulator for duty factor modulated signals has the transfer function $$I_\alpha = \alpha (2 T_1/T - 1), \quad (12)$$

Where $I_\alpha$ is the output current, $\alpha$ is a curcuit gain parameter, $T_1$ is the duration of the first part of the rectangular wave input, and $T$ is the duration of a full cycle; just as in eq. 6. Then the output $I_\alpha$ of a duty factor demodulator driven by a rectangular wave input signal from the oscillator in FIG. 1 may be obtained by inserting eq. 8 in eq. 12; thus $$I_\alpha = - \alpha (H_i/H_x - H_c),$$

or $$I_\alpha = -(\alpha/H_x - H_c)(N_i/l) I_i. \quad (13)$$

In eq. 13, the input signal is either magnetic intensity $H_i$ or current $I_i$, or both can be used and they will add algebraically. Note that in this case the synthetic circuit magnetic intensity $H_X$ should be stable because the output due to the duty factor modulated signal is nearly proportional to the factor $H_i/H_X$, since $H_C$ is generally much less than $H_X$.

This duty factor signal can be used with an amplifier and demodulator to increase the permissible load circuit or meter resistance in applications where $R_S$ must be minimal to obtain great sensitivity. Thus a low cost meter or high power load can be used in an instrument having very few sense inductor turns $N_S$ so as to be responsive to less than one milliampere direct current. Note that the duty factor modulation is always a measure of the restoring current $I_S$. This is apparent when eq. 7 is inserted in eq. 3. Output current $I_S$ acts directly to produce $V_C$, and $V_C$ directly modulates $T_1/T_2$; i.e., duty factor.

The output of the rectangular wave oscillator will be a square wave ($T_1 = T_2$) and the period $T$ will be invariant with input if inductor circuit resistance $R_S$ approaches zero and/or a high supply voltage $V_X$ is used. However, the small modulation of period $T$ shown in eq. 4 does not detract from the ideally linear form of the duty factor signal given in eq. 8.

FIG. 2 shows a practical rectangular wave oscillator circuit and input current sensing inductor which come sufficiently close to satisfying the requirements of the functional diagram and hysteresis loop of FIG. 1 to function as an effective direct current milliammeter. Two independent current inputs $I_{i1}$ and $I_{i2}$ are shown in FIG. 2 to illustrate the construction of a milliameter reading the algebraic sum of several input currents. Since the usual application calls for measuring one current input, and to simplify the analysis, the weighted algebraic sum of all inputs is designated as $I_i$ and used in the analysis which follows. A detailed statement of the action of several independent current inputs is given in Eqns. 15 and 16 on page 18 and the discussion associated with these Eqns. The simple means for modifying FIG. 2 to obtain power gain and, thus, increased sensitivity, shown in FIG. 9 are discussed in connection with FIG. 8.

The 1.5 volt "C" cell $V_{cc}$ supplies current to the direct coupled complimentary symmetry flip-flop comprising $Q_1$ and $Q_2$ which are PNP silicon transistors Type 2N5143, and also to $Q_3$ and $Q_4$ which are NPN silicon transistors 2N5128, all manufactured by Fairchild Semiconductor Corporation, through 16 ohm current limiting resistor $R_{SM}$. If it is assumed that the dotted terminal of rectangular wave oscillator output voltage $V_X$ terminal pair is positive 0.7 volts with respect to the undotted terminal it will be seen that $Q_1$ and $Q_4$ are conducting the first part of the operating period T, when $Q_2$ and $Q_3$ are cut off. The current $I_{CC}$ is essentially constant and equal to 50 milliamperes over the whole operating period $T$, since when $i_S$ is small during the middle portion of $T_1$ most of $I_{CC}$ flows through the base of $Q_1$ to the collector of $Q_4$ and through the base of $Q_4$ from the collector of $Q_1$. This keeps $Q_1$ and $Q_4$ saturated so that their emitter to collector voltage is only a few millivolts. It also establishes $V_X = 0.7$ volt.

However, as core SQ saturates near the end of period $T_1$ its winding $N_S$ draws a very large current $i_S$ which quickly exceeds the current $I_{CC} = 50_{ma}$ available when $V_X = 0.7$ volt. This reduces $V_X$ to a value less than the $0.7V$ which is required to produce a significant base current in $Q_1$ and $Q_4$, so these transistors switch from saturated closed switches to open circuit in a very short time. Note that the core SQ is coupled to the active elements of the oscillator by winding $N_S$.

The core SQ used in FIG. 2 is a nearly ideal square loop tape wound toroid manufactured by Magnetics, Inc., Butler, Pa., having their type number 50057-½ F. I use $N_S = 100$ turns and $N_i =$ one turn. Capacitor C is a 2100 UF–3 volt unit. The meter has a sensitivity of zero ± 1 milliampere and 20 ohms resistance $R_S$.

Energy stored in the inductance $L_S$ is released to steer the current $I_{CC}$ into the bases of $Q_2$ and $Q_3$ by inverting the polarity of the output terminals $V_X$ of the rectangular wave oscillator at the start of second time interval $T_2$, S0 $Q_2$ and $Q_3$ saturate and $V_X$ equals $-0.7V$ during all of $T_2$. This inverts the voltage across $L_S$ and causes the flux in SQ to start switching back to saturation in the other sense. Period $T_2$ ends when the flux density $B$ in SQ exceeds $B_M$ to cause a sharp increase in the magnitude of current $i_S$ and, hence, reversion of $V_X$ back to the original positive polarity.

Thus, the functions required in FIG. 1 are satisfied by the circuit of FIG. 2.

The maximum current threshold $I_{SM}$ is very nearly $I_{CC}$ because the base current required to saturate a complimentary pair is much less than 50 ma. The value of $R_{SM}$ may be adjusted to satisfy the requirement $$I_{sm} \geq (l/N_s)\, H_i \text{ max.} \tag{5A}$$

While the magnitude of $H_i$ is shown less than $H_C$ in FIG. 1, this is not a requirement. $H_i$ may greatly exceed $H_C$ so long as eq. 5A is satisfied. The oscillator $Q_q$–$Q_4$ will function even though $i_S$ is forced to be always of one polarity by a large input $H_i$ or $I_i$.

Greater currents may be handled if transistors having high gain and larger junction area are used in positions $Q_1$–$Q_4$. It may be advisable to increase $V_{CC}$ and/or reduce $R_{SM}$. The operating voltage $V_X$ may be increased to 7 volts or more by inserting a resistor in series with each transistor base lead. A typical valve is 1,000 ohms.

The method of the present invention will be described in more detail in the following analysis of the practical circuit shown in FIG. 2. The method for applying the general relations shown as eq. 1 to eq. 14 is described where the specific values shown in FIG. 2 are inserted.

The ½ mil supermalloy iron tape used in the Magnetics, Inc., Butler, Pa., sense core toroid SQ shown in FIG. 2 has a coercive force $H_C$ in the order of 0.8 ampere turns/meter. The saturation flux density $B_M$ is about 0.7 webers/square meter. The mean flux path length 1 of the 50057-½ F core is about 0.055 meter and the cross-sectional area A is $4 \times 10^{-6}$ M². Using $N_S = 100$ turns 28 wire, which are preferably evenly distributed around the whole core so as to minimize errors due to noise fields, we expect the period to approach $$T_0 = \frac{4N_sAB_m}{V_x} = \frac{(4)(100)(4\times10^{-6})(0.7)}{0.7} = 1.6 \text{ milliseconds.} \tag{4a}$$

The synthetic circuit magnetic intensity is $$H_x = \frac{N_sV_x}{lR_s} = \frac{(100)(0.7)}{(.055)(20)} = 64. \text{ Ampere Turns/meter.} \tag{9}$$

This compares favorably with $H_C = 0.8$, so we expect nearly ideal results.

The current transformation ratio is determined by the selection of $N_S$ and $N_i$. Current sensitivity is increased by decreasing $N_S$ and increasing $N_i$. Having assigned $N_S = 100$ turns and determining to simply pass the wire carrying the current to be measured once through the hole in the sense toroid core, we obtain $$\frac{I_s}{Ii} = -\left(\frac{N_i}{N_s}\right)\left(\frac{1}{1-\frac{H_c}{H_x}}\right) = -\left(\frac{1}{100}\right)\left(\frac{1}{1-\frac{0.8}{64.}}\right) = -\left(\frac{1}{100}\right)(1.0125). \tag{10A}$$

Thus the current transformation ratio is about 1 percent greater than ideal. This discrepancy could be largely eliminated by adding one turn to coil $N_S$ or inserting a small conductance shunt resistor across the terminals of meter M having resistances $R_S = 20.$ ohms.

The maximum input current $I_{i\,max}$ must not produce a field exceeding that corresponding to the threshold current $I_{SM}$ which is nearly equal to $I_{CC}$, or 50 ma. Then the maximum input current which will be measured by the circuit of FIG. 2 is given by $$I_i \lesssim \frac{N_s}{N_i} I_{sm}$$
$$\lesssim \left(\frac{100}{1}\right)(.05)$$
$$\lesssim 5.\text{ amperes.} \quad (5)$$

To find the duty factor modulation resulting from a confortably safe 1.0 ampere input, first calculate the magnetic intensity applied to core SQ coupled to a 1 ampere input current by a single turn.

$$H_i = \frac{N_i}{l} I_i$$
$$= \left(\frac{1}{.055}\right)(1.)$$
$$= 18.\text{ amperes turns/meter.}$$

The duty factor term is $$\frac{2T_1}{T} - 1 = -\left(\frac{1}{H_x - H_c}\right)\left(\frac{N_i}{l}\right) I_i$$
$$= -\left(\frac{1}{64. - 0.8}\right)\left(\frac{1}{.055}\right)(1)$$
$$= -0.29.$$

$$\text{Thus } \frac{T_1}{T} = 0.36, \text{ and } \frac{T_2}{T} = 0.64. \quad (8A)$$

The integrating capacitor voltage $V_C$ with 1. Amp. input producing 0.01 Amp. $I_S$ is $$V_c = R_s I_s$$
$$= (20)(.01)$$
$$= 0.2\text{ volt.} \quad (7A)$$

The resulting period is $$T = T_0 \left\{ \frac{1}{1 - \left(\frac{V_c}{V_x}\right)^2} \right\}$$
$$= 0.0016 \left\{ \frac{1}{1 - \left(\frac{0.2}{0.7}\right)^2} \right\}$$
$$= 0.0016(1.09)$$
$$= 1.74\text{ milliseconds.} \quad (4A)$$

However, this change in period does not reduce the linearity of the duty factor term.

The duty factor modulated signal appearing at terminals $V_X$ may be connected directly or through a buffer amplifier to the input of a telemetry link having a suitable demodulator at the data accumulation station.

Small and rugged meters M are available with 20 ohm resistance $R_S$ and $0 \pm 1$ milliampere full scale indication which are easily readable to $0 \pm 0.05$ ma. $I_S$. Then the circuit of FIG. 2 will measure 5 ma input $I_i$ and is operable up to 5. amperes; a 1,000 to 1 range, assuming the meter circuit is modified to avoid overload.

This 1,000; one dynamic range is useful in a remote measuring system which may include a telemetry link, since no parameter change is required at the remote sensing point. Meter or recorder scale change is performed at the central data accumulation station.

In a small portable instrument, the simplest method of changing sensitivity is to shunt the meter $M$ with a resistor $R_{SS}$. Since the 20 ohm-1ma meter requires only 20 millivolts $V_C$ to produce full scale deviation, the shunt for $0 \pm 1.0$ ampere full scale would be about 2.2 ohms. This will reduce the duty factor to 0.028 because the $H_X$ term in eq. 8 has been increased from 64 to 640 ampere turns/meter by the tenfold reduction in the net value of $R_S$ paralleled by $R_{SS}$.

The charge integrating capacitor C is required to be large enough to hold $V_C$ essentially constant over a full period $T$. In the ideal case, the cyclically reversing oscillator current $i_S$ departs from a median value by an amount corresponding to $H_C$ for a time approaching $T/2$. The variation in charge $\Delta Q$ of capacitor C should produce only a minor charge in its voltage $\Delta V_C$; minor being relative to supply voltage $V_X$. A safe value of $\Delta V_c/V_x$ is generally 0.01. Then the capacitance of the integrating capacitor is expected to be sufficient if $$C \geq \frac{\left(\frac{l}{N_s} H_c\right)\left(\frac{T_0}{2}\right)}{0.01 V_x}$$
$$\geq \frac{\left(\frac{.055}{100} 0.8\right)\left(\frac{.0016}{2}\right)}{(.01)(0.7)}$$
$$\geq 50.\mu F. \quad (14)$$

However, this value may be increased if other factors have an overriding importance. For example, some good meters have a considerable inertial generator output charge and this may require a capacitance as great as 2,100 $U_F$. However, this is not a problem because polarized electrolytic 3 volt units can be used with negligible error since $V_C$ is so small.

The peak deviation of $i_S$ from mean may be substantial and endure for an appreciable part of a half period if the sense inductor core SQ has some air gap. This may occur in the clip-on sensing inductors to be described. Then the current to be considered arises from the combined effect of $H_C$ and the inductance term $i_{SL} = V_x\, t/L_S$. The greatest value of C needed to date is 2,100 $U_F$. The rather small Sprague Type 35D–2100$U_F$ 3V is sufficient.

Ordinarily, if the net value of $R_S$ and shunt $R_{SS}$ is small, no capacitor is required. For example, in FIG. 2, if $R_S$ is 2, ohms when operating at 1.0 Amp. full scale, the coercive force current term $H_c\, l/N_s = 0.5$ ma. produces only 1 millivolt $\Delta V_c$, which is much less than the 7 millivolts $\Delta V_c$ found to be safe.

In most applications of the present invention, the current to be measured $I_i$ flows in a single conductor having turns $N_i$ linking the toroid core SQ in FIG. 2. However, this is not a limitation. The basic quantity measured is input magnetic intensity $H_i$, and this can be the weighted algebraic sum of contributions from several input currents $I_{i1}$, $I_{i2}$, — flowing in several separate input coils $N_{i1}$, $N_{i2}$, —, all linking the core SQ. Thus the output asymmetry of the oscillator which is ordinarily observed as duty factor modulation, and the restoring current $I_m$, are both the output of a computing device which sums and/or differences several inputs. Moreover, if the sense inductor $L_S$ has the form to be described in connection with FIG. 7, this computation can also include inputs from magnetic fields.

When the contributions of $n$ current inputs and m magnetic field outputs are to be algebraically summed, the equations 1 thru 14 are understood to define $H_i$ more broadly as $$H_i = \sum_{j=1}^{j=n} N_{ij} I_{ij} + \sum_{k=1}^{k=m} H_{ik}. \quad (15)$$

When eq. 15 is inserted in eq. 6, it develops that the output current $I_S$ is a linear function of the weighted algebraic sum of all inputs. If we assume that $H_C$ is very small and only input currents are to be measured, the output closely approaches $$I_S \triangleq -(1/N_s) \left\{ N_{i1} I_{i1} + N_{i2} I_{i2} + \text{—} + N_{ij} I_{ij} \right\} \quad (16)$$

This is the current transformer relation of eq. 11 expanded to algebraically sum the weighted contributions of several separate input currents flowing in a corresponding number of electrically insulated conductors, all of which link the non-linear core. This core is then acted upon by an input magnetic intensity $H_i$ which is proportional to the same weighted algebraic sum of input currents, and the output current $I_S$ acts to restore the input offset in the same manner as described before.

In order to provide a more qualitative understanding of the basic operation of the functional diagram FIG. 1, and the practical circuit of FIG. 2, the analysis given above is here reviewed in general physical terms.

By the convention shown in FIG. 1, the input current $I_i$ produced a positive magnetic intensity $H_i$. The current $i_S$ in sense coil $N_S$ is derived from an electrical apparatus, which includes switch SW together with its threshold current $I_{SM}$ sensing and switch actuating means; and batteries $+V_X$ and $-V_X$ together with meter M and capacitor C.

The positive polarity current $i_{S1}$ flowing during the first time interval $T_1$ produces a negative magnetic intensity $H_{S1}$ which has magnitude corresponding to $H_C$ added to $H_i$ because it must overcome the bias of $H_i$. On the other hand, during second interval $T_2$, the negative current $i_{S2}$ has magnitude corresponding to $H_C$ minus $H_i$. Thus, $i_{S1}$ exceeds $i_{S2}$ in magnitude and has positive polarity. This will at first occur for equal times $T_1 = T_2$ because the start-up voltage $V_C$ of capacitor C is zero. Hence, the average value of $i_S$ which is designated $I_S$ will be positive and charge C so that $V_C$ will be positive in the convention shown in FIG. 1.

It can be shown from Faraday's law: $e = -N\, d\phi/dt$ that the time interval required to switch the flux in core SQ from a saturation density in one sense to saturation density in the opposite sense is inversely proportional to the voltage $v_S$ appearing across sense winding $N_S$. The positive value of $V_C$ developed above decreases $V_{S1}$ but increases $V_{S2}$, so $T_1$ is increased and $T_2$ decreased. This means that the average current $I_S$ is composed of greater positive current $i_{S1}$ flowing for a longer time $T_1$ than lesser negative current $i_{S2}$ flowing for lesser time $T_2$, thus, the effect of $V_C$ is to magnify or regenerate the average output current $I_S$ delivered to the load or meter. Increasing meter resistance $R_S$ still further increases this regeneration, and in the extreme case of very large $R_S$, instability and "latchup" can occur. Ohmic resistance in the switch SW and winding $N_S$ has an effect quite similar to increasing $R_S$.

The above shows that the alternating electrical potential $V_S$ output of the electrical apparatus is asymmetrical, i.e., $T_1$ does not equal $T_2$. This is called an output wave asymmetry or duty factor modulation. Moreover, this output has an asymmetrical current waveform in that the magnitude of $i_{S1}$ does not equal that of $i_{S2}$. Thus, there is a direct current component in the output and $I_S$ is finite in magnitude when a substantial input $H_i$ is applied.

It was also shown above that a positive input current $I_i$ produced a positive field $H_i$. But, by the convention, the positive current $I_S$ developed above produces a negative average field $\overline{H}_S$. Then the effect of output current $I_S$ is to produce an average magnetic intensity $\overline{H}_S$ which at least partially counteracts the effect of input field $H_i$. Thus, $\overline{H}_S$ is a restoring magnetic field produced by restoring current $I_S$, relative to the offset effect of the input field $H_i$. This is found to occur whether $H_i$ is positive or negative. In fact, in the more ideal designs, the counteracting or restoring effect is almost 100 percent, and nearly ideal direct current transformer action results. Since an inductor cannot of itself produce a direct current, the output current $I_S$ had to come from the above-mentioned electrical apparatus, which is sometimes called the oscillator. Note that in this case the output current $I_S$ flowing in the load or meter $m$ is coupled to the core SQ by winding $N_S$.

I have noted that switch SW in FIG. 1 is transferred whenever the magnitude of $i_S$ exceeds threshold current $I_{SM}$. The rapid increase in the magnitude of $i_S$ results from the saturation of non-linear core SQ. To see this, it is necessary to introduce Faraday's law in the form $i_S = V_S\, t/L_S$, and note that
$L_S = UA_N/1\, S^2$, where
$t$ is the time variable,
$L_S$ is here the magnitude of inductance in Henrys,
$A$ is the cross-section area of core SQ,
$l$ is the mean flux path length of core SQ, and
$U$ is the permeability $dB/dH$, i.e., the slope of the $B$–$H$ curve in FIG. 1 at the induction
$B$ present in core SQ at time instant $t$.

Then it is apparent that $i_S$ is a ramp function having a slope inversely proportional to permeability U = $dB/dH$. If magnetic induction $B$ changes greatly with only a small change in magnetic intensity $H$, as is apparent in FIG. 1 for $B = 0$, then U is large and $i_S$ changes only slightly over a substantial time interval. However, when induction $B$ equals or exceeds saturation flux density $B_M$, a large change in $H$ will produce little change in $B$, so the value of $L_S$ is small at such an instant of time $t$. Then the slope of ramp function $i_S = V_S t/L_S$ is much increased and the magnitude of $i_S$ will be great after a well-defined time interval of $T_1$ or $T_2$.

This shows how the asymmetrical current (the magnitude of $i_{S1}$ was shown above to not equal the magnitude of $i_{S2}$) drawn by the lead wire pair of coil $N_S$ forming sense inductor $L_S$ on and coupled to core SQ can produce an output asymmetry having a direct current component at the terminals $V_X$ of the electrical apparatus or oscillator shown in FIG. 1. The same explanation will be found to apply to FIG. 2. It is also apparent from the foregoing that output current $I_S$ and the output asymmetry or duty factor modulated signal available across either terminals $v_x$ or $v_s$ are a function of input current $I_i$. If it is desired to measure an input magnetic intensity $H_i$ directly, it is only necessary to use a core SQ laid out in a straight line or curved to match the poles of the magnet and expose it to $H_i$, as will be shown.

The method and means described above are not the only ones I have used to construct a direct current or magnetic intensity measuring instrument using the basic principles described by what has been written. They are samples of the simplest, most sensitive, accurate and economical techniques used. However, this method of magnetic intensity measurement using a more or less saturable or non-linear square loop core inductor connected to an oscillator circuit is much more general.

The principles of the present invention can be stated in abbreviated language as follows:

An oscillitory electrical circuit, such as a free running resistance or inductance coupled oscillator or a synchronously driven oscillator, is coupled to a sense inductor comprising a sense winding over a core of magnetic material having a non-linear $B$–$H$ curve in such a way that some degree of core saturation will cause an asymmetry (duty factor modulation, pulse amplitude modulation, etc.) in the oscillator's output having a direct current component which at least partially restores the magnetic intensity offset originally induced in the core by an input current linking the core or a magnetic field coupled to the core, and a measure of the input current or magnetic field intensity is obtained by measuring the restoring current and/or asymmetry in the oscillator's output.

More specifically, the method of measuring a direct current or magnetic field is to construct an electrical apparatus having an oscillatory output which is coupled to a sensing and measuring inductor coupled to a core of magnetic material which has an appreciable non-linearity in its $B$–$H$ curve such as that shown in FIG. 1 and commonly exhibited by nickel-iron alloy steel, grain oriented silicon steel, certain compounds of iron oxide in combination with various metallic oxides commonly termed ferrites, or other magnetic material having similar flux saturation characteristics in general evidenced by a high permeability dB/dH at some low magnetic induction $B$ and a substantially lower permeability at some larger magnetic induction; the apparatus and coupling being constructed so that an asymmetrical current drawn by one or more of the windings of the sensing and measuring inductor which are coupled to the non-linear core can produce a change in the electrical waveform of the output from the apparatus to the sensing and measuring windings which has a direct current component which can cause a magnetic intensity restoring effect on the core so as to at least partially counteract or correct for an input in average magnetic intensity resulting from the flow of a current to be measured in one or more turns of conductor linking the sense and measurement core, and/or at least partially correct for an input change in average magnetic intensity resulting from coupling the core to a magnetic field to be measured; and measuring either the change in the asymmetry of the electrical waveform of the output or the direct current component, or both, since both are a function of the input to be measured. In certain embodiments using nearly ideal components, calibration can be performed by a design analysis similar to that given in connection with a discussion of FIGS. 1 and 2 above; but it is generally preferred to calibrate the instrument by measuring the change in the asymmetry of the electrical waveform output or direct current component resulting from the application of several currents or magnetic fields of known direction and magnitude.

One of the many means available for accomplishing these ends is the familiar Royer oscillator shown in FIG. 3. The period of oscillations may be determined by the inductor in FIG. 3, but this is not necessary. Timing signals from an external drive input source may be used to force the oscillator to operate at a period shorter than that dictated by the sensing and measuring core SQ. In either case, the input field $H_i$ resulting from current $I_i$ will gradually force the operating point of core SQ to saturation in at least one sense, the circuit will supply a nearly equal and opposite net average magnetic intensity to restore the operating point of core SQ so that it is generally not in saturation, and the output current to meter M or some other load is obtained by measuring the current producing this restoring magnetic intensity. The asymmetry of the electrical waveform appearing across one of the windings coupled to core SQ may also be used as an output. In general, when an input field is present, the time interval during which $Q_1$ is saturated will be greater or less than the time interval during which $Q_2$ is saturated. This effect will be more noticable if the resistors $R_L$ in FIG. 3 are made greater than 10 ohms. The duty factor modulated signal can be transmitted to a remote point and demodulated to produce an output which is a function of the input current or field to be measured.

However, the circuit of FIG. 3 is not as readily adapted to many practical measurement problems so it is not generally preferred.

I have constructed and tested a variety of sensing inductors designated as $L_S$ in FIGS. 1 and 2. The preferred types have only one sense coil $N_S$ with one lead wire pair brought out from the subassembly because of the simplicity and economy of this arrangement. However, in the best stray magnetic field noise cancelling units which can be opened up to clip over the conductor carrying a current to be measured this sensing and measuring coil $N_S$ is split into two equal and uniformly wound parts which can be either series of parallel connected, but series connection is ordinarily preferred. The sensing and measuring inductors $L_S$ shown in FIGS. 4, 5 and 6 may be connected to an electrical apparatus having an alternating electrical potential comprising, in this instance, the rectangular wave oscillator and meter circuit shown in FIG. 2. This is done by removing the lead wire pair of the inductor shown connected to terminal pair $V_S$ and connecting the lead wire pair of one of the sense inductors shown in FIGS. 4, 5 or 6 to the terminals designated $V_S$ in FIG. 2.

Whenever practical, it is preferred to use a sense inductor core which has the torus or toroidal form of the magnetics 50057-½ F core shown for FIG. 2 because this generally reduces errors due to magnetic interference noise and circuit or core imperfections. The toroid core SQ with uniformly distributed winding $N_S$ is the ideal design objective of the more convenient to use split core clip-on sense inductors $L_S$ preferred when convenience in attaching the instrument is important.

A practical noise-cancalling clip-on DC ammeter sensing and measuring inductor which is used to resolve 1 milliampere direct current on a ± 50 ma full-scale instrument is shown in FIG. 4. Two half sections 1 and 2 of cylindrical tube having 0.5 inch outside diameter, 0.25 inch inside diameter, and 0.45 inches length, and made of relatively non-conducting and reasonably rigid material, such as plexiglass or Poly Vinyl chloride (PVC) are wound with one or more layers of square loop tape 3 and 4. Such a tape is found within the case of a toroidal core manufactured by Magnetics, Inc., of Butler. Pa., and designated 50094-1D. A single layer is preferred. The overlaps 5 and 6 are preferably ⅜ inch. The length of the cylindrical tube sections 1 and 2 is preferably a little more than the 0.4 width of the tape 3 and 4. The square loop tapes 3 and 4 may be held in place with insulating adhesive tape wound overall.

When the top and bottom halves are brought into intimate contact so as to minimize air gaps 7 and 8, there is formed a closed toroidal core such as is designated as SQ in FIGS. 1 and 2. The structure shown in FIG. 4 is especially designed to minimize the reluctance of the air gaps 7 and 8 even though there may be a small misalignment in joining halves 1 and 2. The large cross-sectional area at gaps 7 and 8 also reduces the flux density and thus reduces eddy current losses occurring where flux flows across the tape. However, the two halves of this toroid may be separated to admit one or more turns $N_i$ of wire 13 carrying input current to be measured $I_i$ without the need to disconnect one end of the wire and pass it through a closed toroid. This saves much time and labor in making measurements.

The two windings 9 and 10 each have 50 turns of 36 Anaconda HAN magnet wire. They are series-connected, so $N_S = 100$. The windings are made as uniform and symmetrical as feasible to optimize noise concellation. The total ohmic resistance $R_S$ is about 5 ohms at lead wire pair ends 11 and 12. In use, these connect to terminals $V_S$ in FIG. 2. The operating period $T_0$ is then 180 microseconds.

Ferrite or laminated steel "C" cores of UI cores of a variety of sizes may also be used to form core SQ. Two essentially equal halves of Indiana General ferrite toroid core CF 106-06 having form similar to halves 1 and 2 in FIG. 4 are suitable for some purposes.

The core sections and windings 9 and 10 need not be symmetrical and balanced as shown in FIG. 4, bu this is preferred for noise cancellation as will be described.

I have found that unsymmetrical clip-on DC ammeter sense inductors using unbalanced construction such as one with a flat bar having no winding 10 used to replace both half 2 in FIG. 4 are likely to give an erroneous current reading when used near the magnet of an alternator or large meter. Even the earth's magnetic field can shift the zero reading of the more sensitive instruments if they use an unsymmetrical sense inductor construction. A large direct current flowing in a nearby conductor can also cause an erroneous reading. These sources of error are termed noise. The preferred clip-on structure shown in FIG. 4 approaches the ideal noise cancelling properties of a toroidal core SQ with windings 9 and 10 laid around and over the core with nearly perfect uniformity and symmetry in distribution of winding turns all around the core.

The nearly ideal noise cancelling property of a uniformly wound toroid results from the fact that an incident noise magnetic field will produce equal and opposite megnetic intensity errors under equal numbers of turns in winding 9 and 10, so, except for extreme cases, the effect of noise is very nearly zero. In the case of clip-on cores, it is preferred that the air gaps 7 and 8 be equal and balanced and small. The reluctance of the air gap may be reduced by using a wider cross-sectional area of tape in the vicinity of the air gap than under most of the winding, and this is expected to reduce the effect of noise in some embodiments. In practically all clip-on sense core constructions, it is preferred to minimize the overall length and magnetic reluctance of the complete core.

The two halves 1 and 2 are preferably held in intimate contact to minimize air gaps 7 and 8 by a spring clip arrangement which can be simulated by adhering the two halves to the inside surfaces of the top and bottom jaws of a large clothespin. Copper alligator clips and $\alpha$-shaped spring brass rod have also been used. However, it is preferred to tool up to produce a suitably shaped phosphor bronze or spring plastic clip to hold the two halves 1 and 2 together as shown in FIG. 4 after they have been clipped over the conductor carrying the current to be measured.

A similar but substantially larger clip-on sense inductor has been constructed in order to measure the current in a larger diameter wire carrying up to 80. amperes direct current. To provide a suitable support for the core material, I used a PVC cylinder having 1-⅛ inch outside diameter, 0.7 inch inside diameter, and 0.6 inch length, split into two equal halves 1 and 2 as shown in FIG. 4. The larger aperture necessary to ccommodate an 80 ampere battery cable increases the means free path length 1 to about 0.08 meter. For this heavy-duty application, it was deemed advisable to use a heavier 4 mil steel tape of grain oriented nickel-iron alloy such as that found inside Magnetics. Inc., Core No. 50001-4A. In order to accommodate the greatly increased coercive force $H_C$ of 12. ampere turns per meter and the inductive energizing currents due to an appreciable air gap 7 and 8 resulting from the stiffness of the 4 mil core material, it was necessary to provide for a synthetic magnetic intensity $H_X$ approximating 3,200 ampere turns/meter. This value of $H_X$ was obtained by increasing the number of turns $N_S$ to 700, distributed in two symmetrical parts 9 and 10 of 350 turns each of 30 magnetic wire, but this length of wire introduced a resistance $r_S = 10$ ohms in series with $L_S$ in FIG. 2. While the analysis given above does not specifically consider the ohmic resistance of the sense coil $L_S$, I have found that its effect is comparable to an equal resistance $R_S$ in the meter or output circuit of FIG. 2. Thus, in calculating $H_X$, it is necessary to use an effective value for $R_S$ which is the sum of the net meter circuit resistance (10 ohms) and the ohmic resistance of the sense inductor coil $N_S$ (10 ohms), i.e., 20 ohms total.

Another contribution to $H_X$ = 3,200 amperes turns/meter is provided by increasing rectangular wave oscillator operating voltage $V_X$ to 7.4 volts from the previous 0.7 volt value. This is done by inserting a resistance of 1,000 ohms in series with each base lead of each transistors $Q_1$, $Q_2$, $Q_3$, and $Q_4$ shown in FIG. 2. Then the base to emitter junction voltage of each transistor no longer limits the oscillator output $V_X$ to $\pm 0.7V$, and this output rises to 7.4 volts when the battery voltage $V_{CC}$ is increased to 9 volts and current $I_{CC}$ is limited to 150 ma by about 11. ohms resistance $R_{SM}$. A 50UF capacitor C was found to be sufficient.

The embodiment just described has two operating ranges; 8.0 and 80. amperes full scale. The values given above are used on the 8.0 ampere range. To shift to the 80. ampere range, the 10. ohm meter shunt is further shunted by 1.0 ohm. No other circuit value changes are necessary. In both cases, the operating period $T_0$ is 1.6 milliseconds.

The large number of turns $N_S = 700$ is partly dictated by economics. It is desired to use low cost transistors $Q_1 - Q_4$ in FIG. 2, but this means restricting the threshold current $I_{SM}$ in FIG. 1 to about one-fourth ampere. Assuming the maximum current to be measured is about 80 amperes, we calculate $I_{SM}$ is eq. 5A to be about 110 ma. This shows that the 150 ma $I_{CC}$ noted above is adequate to provide a little margin. However, if $N_S/N_i = 700$ were reduced by a substantial factor, it would take more than ¼$A$ $I_{CC}$ to measure 80 amperes.

Battery life in a portable instrument is also increased by designing for minimum $I_{CC}$. This can be an important practical consideration.

In order to conveniently measure a small direct current flowing in a small wire in a restricted space such as is found in a cable bundle leading to a printed circuit card connector in a computer, I have constructed two small clip-on sense inductors as shown in FIGS. 5 and 6. In these the suppression of undesired magnetic noise is obtained by using a combination of the following techniques:

1. The mean flux path length $l$ is minimized by making the whole structure small;
2. The core permeability is maximized by core material selection;
3. The reluctance of the air gap is minimized
3. The reluctance of the air gap is minimized by using an overlapping fold technique similar to that used in sealing the lid on a tin can cylinder as in FIG. 5, or the cross-sectional area of the but joint is increased to give a large area joint as in FIG. 6;
4. The width of the core tape is reduced under the winding and increased near the air gap to reduce gap reluctance relative to coil cor sector reluctance, since the noise magnetic field effective in the core sector directly under the winding is the principal source of error. Noise fields near the air gap are a lesser problem if they do not cause a field to appear under the sense coil winding.
5. Each is small so that a modest sized high permeability soft iron magnetic shield cylinder can be pushed down over the lead wire pair to the clip and slightly past the end where the sense inductor is located, assuming that the wire to be measured is flexible and has a little slack. If not, a notch in the end of the shield will allow the shield to cover the sense coil and still admit the wire being measured.

However, in many practical measurement environments, there is not a strong noise magnetic field, so no field (Item 5) is required and a combination of Items 1, 2, and 3, and possibly 4 will suffice.

FIG. 5 shows a small and thin clip-on sense and measuring inductor $L_S$ for use with the circuit shown in FIG. 2. It is activated by connecting the lead wire pair 11 and 12 to terminals $V_S$ on FIG. 2, and clipping onto a wire 13 carrying current $I_t$ to be measured. The single Sense Coil 9 comprises 100 turns 36 Anaconda HAN magnet wire would as uniformly as possible along much of the length of flexible and split Core 3, which comprises two parallet strips of 1 mil magnetic iron alloy known as Supermalloy because of its unusually high permeability. These strips are each about 0.35 cm. wide as obtained by opening up and unwinding Arnold Engineering Co. Tape Core 5340–S1. It is preferred to use two layers of tape because this lowers the operating frequency below 40 $KH_z$, so $T_0$ is greater than 25 microseconds, which is just about the upper frequency limit for this type steel core. Operation at higher frequencies results in added hysteresis and eddy current losses which appear to the circuit as an apparent series resistor $R_S$ in the inductor $L_S$. The period of operation of this inductor is about 60 microseconds.

However, operation at much greater frequency is feasible when using small cores of ferrite material such as Indiana General Type 0-6 or Ferroxcube, Inc., Saugerties, New York, Type 3E2A. Of course, larger ferrite cores can also be used at low frequencies, but the presently preferred embodiments use a soft iron tape such as that of FIG. 5.

The support 1 and 2 for the core material is the somewhat modified frame of a Mueller Electric Co. Copper Clip No. 45C. This is provided with a spring for holding the jaws closed around wire 13. The jaws 14 and 15 are formed flat and overlapping so that, when the ends 16 and 17 or the split core 3 are secured to the jaws 14 and 15 with adhesive, the air gap 7 will be minimal and core ends 16 and 17 will be joined in a pressure contact having larger surface area. This reduces magnetic noise effects because the magnetic reluctance of the clip-on gap is minimized. When the clip is closed, the free area for Input Wire 13 carrying input current $I_t$ is about 3 millimeters × 5 millimeters.

The other small clip-on sense and measuring inductor $L_S$ shown in FIG. 6 is similar to FIG. 5. It is used in the same manner but constructed somewhat differently. The single Sense Coil 9 comprises 50 turns of the same HAN 36 wire but this is deliberately nonuniformly distributed in a lump in the sector in the back of the jaws. The coil $N_S$ is wound over two layers of 0.13 inch wide, 1 mil thick, soft Iron flexible and split core 3. This is a tape manufactured by Magnetics. Inc., and trade named Hi U 80, which is similar to the tape in their Core 50094-1D. The remainder of the split core 3 is necked out to 0.28 inch width, especially at the ends 16 and 17 near air gap 7. These ends 16 and 17 are attached to jaw ends 14 and 15 of Mueller Clip 45C Halves 1 and 2, which support the core. This clip includes a spring to hold the jaws closed. In order to minimize the magnetic reluctance of the gap, these jaws are especially widened to provide an increased cross-sectional area of tight-pressed junction of core ends 16 and 17. When closed, the cross-sectional area available for the wire to be measured is about 2½ by 3 millimeters. When used with the circuit shown in FIG. 2, the period of rectangular wave oscillator is about 30 microseconds.

The clip-on current sense inductors shown in FIGS. 5 and 6 resolve 1 milliampere direct current in restricted areas and are practical for use in a laboratory environment with the electrical apparatus shown in FIG. 2. Full-scale meter calibration needs to be adjusted somewhat differently for each. This is done by adjusting a meter shunt.

On the other hand, the magnetic intensity sense and measurement probe shown in FIG. 7 is arranged for maximum exposure to nearby magnetic fields. It will also respond to direct currents flowing in wires would on its surface but this is not the primary purpose. This sense inductor operates as a sensitive compass, i.e., earth magnetic field detector, showing both magnitude and direction of field. It will also operate as a magnetometer, providing a measure of the direction and intensity of nearby magnetic fields. Moreover, if the ends of the core 16 and 117 are extended and suitably bent to match the separation of the poles of a magnet so as to couple the core to the magnet, the magnetic intensity of the magnet can be measured. As before, the lead wire pair 11 and 12 connect to terminals $V_S$ on the apparatus shown in FIG. 2.

In FIG. 7, the front half of Tube 1 is cut away to more clearly show the central core 3. The sense coil 9 has 350 turns $N_S$ of 30 wire wound in roughly 5 layers in the central 1¼ inch sector of a plastic cylindrical tube (the casing of a popular BIC pen) having length 5 inches, outside diameter about five-sixteenths inch, and inner axial hole about 5 millimeters in diameter. It is large enough to contain a rolled-over steel strip comprising Core 3, which is a short length of Magnetics, Inc., Hi U 80 or 50094-1D tape material 0.4 inches wide, 1 mil thick, and about 4-¾ inches long. The whole assembly is protected by several coats of INSUL-X Plastic.

Core 3 may be termed a "flux collector" by some persons but, in this case, the operation is to measure the applied magnetic intensity at the center of the core. When used to measure the intensity of the earth field by connecting lead wire pair 11 and 12 to terminals $V_S$ on FIG. 2, the operating period of the rectangular wave oscillator is 350 microseconds. When xposed to the horizontal component of the earth's magnetic field at Sarasota, Florida, a deviation from east-west null of ten degrees on the 360° compass scale produces ⅛ milliampere output current $I_S$, and the polarity of the current is determined by the direction of departure from null. When pointing due north, the output is +1.6 ma, and for due south, it is −1.6 ma. The horizontal earth field is estimated at 0.2 Oersted.

FIG. 8 is a functional diagram showing how many of the principles and specific means of the present invention can be applied and assembled to form a system for measuring direct current at a remote point. In this illustrative example, the Algebriac sum of currents $T_{t1}$ and $I_{t2}$ flowing at a remote date station RDS in a high voltage direct current transmission line $HV$ supported by insulators on poles P is measured and translated into a duty factor modulated signal. This is conveyed over a telemetry line TL to a Central Data Station CDS for memory in a recording galvanometer RG, display on meter M or other indicating device, and analysis or use in an on-line or real time control system involving computer COMP.

In a preferred form, the sense inductor $L_S$ comprises a large diameter toroid core SQ using magnetic material similar to Magnetics, Inc., square orthonal wound as a thin tape to form a core proportioned roughly as their Core 50018-4A, but greater diameter; the core being insulated and uniformly wound with a multiplicty of turns $N_S$ calculated in accordance with the principles of this invention, especially those shown in connection with the discussion of FIG. 1 and equations 1 through 14; the core and winding being further insulated to withstand the high voltage with margin. The line $HV$ is passed through the hold in the fully insulated core SQ.

In an alternative construction preferred when it is not convenient to pass the high voltage line $HV$ through a closed toroid core SQ, a pair of "C" cores such as those manufactured by the Arnold Engineering Company, Morengo, Illinois, are uniformly wound with turns $N_S$ in a manner similar to that shown in FIG. 4 and, after full insulation, clamped over the high voltage line and banded together to form something approaching a toroid sense inductor $L_S$.

A lead wire pair 11 and 12 in FIG. 8 connect the sense inductor to terminals $V_S$ on a rectangular wave oscillator OSC. This is designed and constructed in accordance with the principles specified in preceding sections, especially those relating to equations 1 through 14. Terminals $V_C$ may be used to drive optional recording galvanometer RG. Terminals $V_X$ provide the asymmetrical alternating potential duty factor modulated signal to be transmitted over a telemetry line TL which may be a telephone line, carrier link on the high voltage line $HV$, or radio link. Signal buffering and conditioning required to isolate terminals $V_X$ from the loading effects of the link TL and produce a suitable transmission format are provided by amplifiers and signal translators in functional block $A_1$. Tleemetry techniques well known to those skilled in the art may be used for this purpose.

At the central data station CDS, the telemetry signal received over telemetry link TL is decoded and conditioned using standard telemetry techniques embodied in apparatus contained in functional block $A_2$ and duty factor demodulator DFD. These preferably but not necessarily provide a signal linearly proportional to current $I_t$ which may be displayed on meter M, and recording galvanometer RG; and operated upon by Computer COMP. This may be a part of a real time control system regulating the transmission of power on line $HV$.

In some applications of the principles of the present invention, it may be desired to drive a meter M or other output load requiring more power than can conveniently be supplied by the current or magnetic field sensing or measuring instrument, including sense inductor $L_S$, and oscillator OSC, shown in FIG. 8. It may then be preferred for economic reasons to provide power gain for duty factor modulated signal $V_X$ or $V_S$ in an amplifier $A$ and then locally demodulate this stronger signal in a demodulator DFD. I have constructed embodiments using this method and find that a few transistors will suffice to provide ten to 100 times more meter power with a comparable increase in sensitivity of measurement. Standard circuit design techniques known to those skilled in the art can be used.

The differential output circuit shown in FIG. 9 is preferred in applications of the present invention requiring more sensitivity or output power than is conveniently provided by the circuit of FIG. 2. A modest increase in sensitivity and power gain is provided by connecting the output meter $M^1$ across the differential voltage source terminals of capacitor $C^1$. This meter may replace the previous meter M, and the terminals $V_C$ in FIG. 2 may be shorted if a duty factor signal is not required.

If still more sensitivity or power gain is required, one of the many commercially available differential DC amplifiers may be used. Its input terminals are connected across the differential voltage source shown in FIG. 9 shunted by capacitor $C^1$ and the output load or meter is connected to the output terminals of the differential DC amplifier.

The differential voltage source shown in FIG. 9 is constructed so that the differential current in resistors $R_{SM1}$ and $R_{SM2}$ is responsive to and ordinarily equals the restoring current $I_S$. To do this, and still retain the advantage of oscillator state inversion when sense inductor current exceeds threshold, and provide an output at a higher impedance, i.e., greater power load; the power supply voltage $V_{CC}$ is increased to preferably 9 volts, current limiting resistor $R_{SM}$ is split into two equal valued resistors $R_{SM1}$ and $R_{SM2}$ of preferably 330 ohms each, one feeding $V_{CC}$ to the emitter of $Q_1$ and the other feeding the emitter of $Q_2$ connect the output indicator $M^1$ across the emitter of $Q_1$ and $Q_2$, which is the differential voltage source acted upon by the differential current ordinarily equal to restoring sense inductor current $I_S$, and preferably connect charge integrating capacitor $C^1$ also across the differential voltage source to keep the emitters of $Q_1$ and $Q_2$ at the same alternating potential.

The differential voltage source shown in FIG. 9 appears adjacent to the positive terminal of supply $V_{CC}$, but comparable results are obtained if resistors $R_{SM1}$ and $R_{SM2}$ are instead or additionally connected in the return path to the negative terminal of supply $V_{CC}$ from the emitters of $Q_3$ and $Q_4$.

I claim:

1. An instrument for measuring direct current flowing in a conductor comprising,
   - a magnetic core of material having a highly non-linear magnetic characteristic,
   - means enabling the magnetic field of said direct current to operate on said core to produce an offset in average magnetic intensity in said core,
   - a single coupling winding on said core, said winding having two terminals, a power supply having two output terminals,
   - switching means coupling the power supply terminals to the terminals of the coupling winding in a first arrangement so that current flows in the coupling winding in a first direction and alternatively coupling the power supply terminals to the terminals of the coupling winding in a second arrangement so that current flows in the coupling winding in a second direction,
   - means directly responsive to the current in the coupling winding to determine when the current in the coupling winding exceeds a threshold current magnitude to cause the switching means to change the coupling arrangement between the power supply and the coupling winding,
   - and means sensing the algebraic sum of the currents in the coupling winding and providing an output indication of the current flowing in the conductor.

2. An instrument for measuring the intensity and direction of a magnetic field comprising,
   - a magnetic core of material having a highly non-linear magnetic characteristic,
   - said core having lineal form,
   - means enabling the said magnetic field to operate on said core to produce an offset in average magnetic intensity in said core in proportion to the intensity of the magnetic field in the direction of said lineal form core,
   - a coupling winding disposed over at least a part of said core, said winding having two terminals,
   - a power supply having two output terminals,
   - switching means coupling the power supply terminals to the terminals of the coupling winding in a first arrangement so that current flows in the coupling winding in a first direction and alternatively coupling the power supply terminals to the terminals of the coupling winding in a second arrangement so that current flows in the coupling winding in a second direction,
   - means directly responsive to the current in the coupling winding to determine when the current in the coupling winding exceeds a threshold current magnitude to cause the switching means to change the coupling arrangement between the power supply and the coupling winding,
   - and means sensing the algebraic sum of the currents in the coupling winding and providing an output indication of the intensity of the magnetic field in the direction of said lineal form core.

3. An instrument for measuring direct current flowing in a conductor comprising,
   - a magnetic core of material having a highly non-linear magnetic characteristic,
   - means enabling the magnetic field of said direct current to operate on said core to produce an offset in average magnetic intensity in said core,
   - a coupling winding on said core, said winding having two terminals, a power supply having two output terminals,
   - switching means coupling the power supply terminals to the terminals of the coupling winding in a first arrangement so that current flows in the coupling winding in a first direction and alternatively coupling the power supply terminals to the terminals of the coupling winding in a second arrangement so that current flows in the coupling winding in a second direction,
   - means directly responsive to the current in the coupling winding to determine when the current in the coupling winding exceeds a threshold current magnitude to cause the switching means to change the coupling arrangement between the power supply and the coupling winding
   - means sensing the algebraic sum of the currents in the coupling winding constructed to produce a useful degree of assymetry between the time duration of the said current in the coupling winding in said first direction and the time duration of the said current in the coupling winding in the said second direction, said assymetry being a measure of said offset and thus said direct current flowing in said conductor,
   - means conveying, sensing, and demodulating said assymetry, the output of said demodulating means being suited for driving an output indication of said current flowing in the conductor.

4. An instrument for measuring direct current flowing in a conductor as claimed in claim 1, wherein said core has the shape of a toroid, and said enabling means include means to facilitate passing the said conductor carrying the said direct current through the hole in the said toroid, and said coupling winding comprises a plurality of turns of wire uniformly wound around said core.

5. An instrument for measuring direct current flowing in a conductor as claimed in claim 1, wherein said core has the shape of a toroid split into two equal halves, and said coupling winding is provided by a plurality of turns of wire wound substantially uniformly around each of said equal turns of wire, and said enabling means including means joining the said halves of said core around said conductor to form said core in a shape approaching that of a closed toroid.

6. An instrument for measuring direct current flowing in a conductor as claimed in claim 1, wherein said core is split in at least one location, and said enabling means include means for inserting said conductor in the central sector of said core without the need to interrupt a direct current which may be flowing in said conductor, and means for closing said split in said core so as to minimize the magnetic reluctance of the path around said core including said split, and said coupling winding is provided by a plurality of turns of wire wound around at least one sector of said core.

7. An instrument for measuring direct current flowing in a conductor as claimed in claim 1, wherein said switching means is rectilinear and so constructed that the electrical potential applied to said coupling winding has well defined extremes and makes relatively rapid transition from one of said extremes to the other of said extremes, said transition being initiated when the said current in the coupling winding exceeds said threshold current magnitude.

8. An instrument for measuring direct current flowing in a conductor as claimed in claim 1, wherein said switching means comprises a reversible transistor switch network.

9. An instrument for measuring direct current flowing in a conductor as claimed in claim 1, wherein said means sensing the algebraic sum of the currents in the coupling winding are constructed to produce a useful degree of assymetry between the time duration of the said switching means in the said first arrangement and the time duration of the said switching means in the said second arrangement, said assymetry being a measure of said offset and thus said direct current flowing in said conductor, and means for producing an alternating potential output signal representative of said assymetry in form suited for driving a load.

10. An instrument for measuring direct current flowing in a conductor as claimed in claim 1, wherein said sensing means includes a resistor and a capacitor, said resistor and capacitor being arranged in a parallel connection, the parallel combination being connected in series with the coupling winding so that the said current in the coupling winding is caused to flow in said parallel combination, said resistor and capacitor having values selected to produce a useful degree of assymetry between the time duration of the said switching means of said first arrangement and the time duration of the said switching means of the said second arrangement, said assymetry being a measure of the said offset and thus said direct current, and means provided to produce an alternating potential output signal representative of said assymetry in form suited for driving a load.

11. An instrument for measuring direct current flowing in a conductor as claimed in claim 1, wherein said means sensing the algebraic sum of the currents in the coupling winding are constructed to produce a useful degree of assymetry between the time duration of the said switching means in the said first arrangement and the time duration of the said switching means in the said second arrangement, said assymetry being a measure of the said offset and thus said direct current flowing in said conductor, and wherein said means providing an output indication of the current flowing in the conductor are constructed to provide means conveying, sensing, and demodulating said assymetry, the output of said demodulating means being suited for driving an output indication of the said current flowing in the conductor 12. An instrument for measuring direct current flowing in a conductor as claimed in claim 1, wherein said means sensing the algebraic sum of the currents in the coupling winding are constructed to provide a useful degree of assymetry between the time duration of the said switching means in the said first arrangement and the time duration of the said switching means in the said second arrangement, said assymetry being a measure of said offset and thus said direct current flowing in said conductor, and means are provided to produce an alternating potential output signal representative of said assymetry in form suited for driving a telemetry link constructed to convey said alternating potential output signal to a location remote from said conductor, and means to demodulate said alternating potential output signal conveyed over said telemetry link and produce an electrical signal representative of said direct current in the conductor suited to driving said output indication of the current flowing in the conductor.

13. An instrument for measuring direct currents flowing in a conductor as claimed in claim 9, wherein means are provided for recording said assymetry, and said means to produce an alternating potential output signal are adapted to driving said recording means.

14. An instrument for measuring direct current flowing in a conductor as claimed in claim 1, wherein said means sensing the algebraic sum of the currents in the coupling winding are constructed to produce a useful degree of assymetry between the time duration of the said switching means in the said first arrangement and the time duration of the said switching means in the said second arrangement, said assymetry being a measure of said offset and thus said direct current flowing in said conductor, and means for recording said assymetry, and means to produce and convey an alternating potential output signal representative of said assymetry in form suited for driving said recording means, and means for playing back the record of said recording means, means demodulating said assymetry, said playing back means adapted to drive said demodulating means, said demodulating means constructed to produce an electrical output signal representative of said assymetry and suited to drive said output indication of said direct current flowing in said conductor.

15. An instrument for measuring direct current flowing in a conductor as claimed in claim 1, wherein the said direct current is made up of several independent direct currents, and the said conductor comprises several separate conductors, each one electrically insulated from all others, there being a separate conductor for each of the said independent direct currents, and the said means enabling the magnetic field of said direct current to operate on said core comprises means enabling each of the said independent direct currents flowing in the said several separate conductors to operate on said core to produce an independent offset in average magnetic intensity in said core weighted in proportion to the degree of coupling of each of the said separate conductors to the said core, the total offset in average magnetic intensity in said core being the algebraic sum of the said independent offsets in average magnetic intensity in said core, and said output indicating means provides an output indication of the current flowing in the conductor comprises means providing an output indication of the weighted algebraic sum of the several independent direct currents flowing in the several separate conductors.

16. An instrument for measuring direct current flowing in a conductor as claimed in claim 1, wherein said magnetic core is in lineal form, and said means enabling the magnetic field of said direct current to operate on said core include means for disposing said lineal form core in direction and position relationship to said conductor so as to produce an offset in average magnetic intensity in said lineal form core in proportion to the magnetic field intensity of the said direct current flowing in said conductor at the position and in the direction of said lineal form core, and said coupling winding on said core comprises a plurality of turns of wire disposed around at least part of said core, and the said means providing an output indication of the current flowing in the conductor includes means providing an output indication of the magnetic field intensity due to the said direct current flowing in the conductor at the position and in the direction of said lineal form core.

* * * * *